US008493440B2

(12) United States Patent
Krijn et al.

(10) Patent No.: US 8,493,440 B2
(45) Date of Patent: Jul. 23, 2013

(54) AUTOSTEREOSCOPIC DISPLAY DEVICE

(75) Inventors: Marcellinus Petrus Carolus Michael Krijn, Eindhoven (NL); Gerardus Petrus Karman, 's-Gravenhage (NL); Willem Lubertus Ijzerman, Eindhoven (NL); Oscar Henrikus Willemsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1092 days.

(21) Appl. No.: 12/097,781

(22) PCT Filed: Dec. 11, 2006

(86) PCT No.: PCT/IB2006/054736
§ 371 (c)(1),
(2), (4) Date: Jun. 17, 2008

(87) PCT Pub. No.: WO2007/072289
PCT Pub. Date: Jun. 28, 2007

(65) Prior Publication Data
US 2008/0266387 A1 Oct. 30, 2008

(30) Foreign Application Priority Data
Dec. 20, 2005 (EP) .................................... 05112525

(51) Int. Cl.
*H04N 13/04* (2006.01)

(52) U.S. Cl.
USPC 348/59; 348/51; 348/E13.001; 348/E13.004; 348/E13.022; 348/E13.024; 348/E13.029; 348/E13.03; 348/E13.064; 345/419

(58) Field of Classification Search
USPC ....... 348/51, 59, E13.001, E13.004, E13.022, 348/E13.024, E13.029, E13.03, E13.064; 345/419
See application file for complete search history.

(56) References Cited

U.S. PATENT DOCUMENTS

| | | | |
|---|---|---|---|
| 5,493,427 A | 2/1996 | Nomura et al. | |
| 6,055,013 A * | 4/2000 | Woodgate et al. | 348/59 |
| 6,069,650 A | 5/2000 | Battersby | |
| 6,124,920 A * | 9/2000 | Moseley et al. | 349/201 |
| 6,801,243 B1 | 10/2004 | Van Berkel | |
| 2001/0050686 A1 | 12/2001 | Allen | |
| 2003/0063186 A1 | 4/2003 | Tomono | |
| 2004/0218245 A1 | 11/2004 | Kean et al. | |
| 2004/0240777 A1 * | 12/2004 | Woodgate et al. | 385/16 |
| 2005/0078108 A1 * | 4/2005 | Swift et al. | 345/419 |
| 2005/0248705 A1 | 11/2005 | Smith et al. | |

FOREIGN PATENT DOCUMENTS

| | | |
|---|---|---|
| EP | 0791847 A1 | 8/1997 |
| GB | 2403815 A | 1/2005 |
| GB | 2415850 A | 1/2006 |

(Continued)

*Primary Examiner* — Kyung H Shin
(74) *Attorney, Agent, or Firm* — Larry Liberchuk

(57) ABSTRACT

A switchable autostereoscopic display device comprises a display panel having an array of display pixels for producing a display, the display pixels being arranged in rows and columns; and an imaging arrangement for directing the output from different pixels to different spatial positions to enable a stereoscopic image to be viewed. The imaging arrangement is electrically switchable between at least three modes comprising a 2D mode and two 3D modes. The imaging arrangement comprises an electrically configurable graded index lens array. The display can be switched between a number of modes to enable the display to be adapted or to adapt itself to the image content to be displayed and/or the display device orientation.

15 Claims, 11 Drawing Sheets

FOREIGN PATENT DOCUMENTS

| | | |
|---|---|---|
| JP | 62077794 | 4/1987 |
| JP | 2000102038 | 4/2000 |
| JP | 2005134663 A | 5/2005 |
| WO | 2005006056 A1 | 1/2005 |

* cited by examiner

AUTOSTEREOSCOPIC DISPLAY DEVICE

This invention relates to an autostereoscopic display device of the type that comprises a display panel having an array of display pixels for producing a display and an imaging arrangement for directing different views to different spatial positions.

A first example of an imaging arrangement for use in this type of display is a barrier, for example with slits that are sized and positioned in relation to the underlying pixels of the display. The viewer is able to perceive a 3D image if his/her head is at a fixed position. The barrier is positioned in front of the display panel and is designed so that light from the odd and even pixel columns is directed towards the left and right eye of the viewer.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device are formed of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer. A more detailed description of the structure and operation of the switchable device can be found in U.S. Pat. No. 6,069,650.

A drawback of both two-view and multi-view 3D displays is that they require the image to be rendered in a special way. In particular, the image should be rendered taking into consideration the pixel layout of the display panel and the layout of the imaging arrangement (lens or barrier). For example, images rendered for 5-view 3D displays will not give the correct 3D impression on a 9-view 3D display. There is also no standard for 3D image/video broadcast or storage.

There is therefore a need to provide a different imaging function for different image formats or display modes, and it would be desirable to enable this in a single device.

There are also applications of display device in which it is desired to have a switchable 2D/3D display that can be used in two 3D modes, for allowing the display to be rotated though 90 degrees. An example is mobile device display applications. The lenticular arrangement described above creates depth in one plane only (a plane orthogonal to the lens direction). If the display is rotated through 90 degrees, there is no depth and, hence, no 3D effect.

There is therefore an alternative need to provide different display modes for different viewing orientations, and it would again be desirable to enable this in a single device. In particular, the ability to selectively provide a display with depth or parallax in horizontal and vertical directions would be desirable.

It has been proposed to provide horizontal and vertical parallax by using round lenses instead of cylinder lenses. Such lenses can be made switchable in a similar manner as described above for the cylinder lenses. Unfortunately, round lenses result in an increased resolution loss. For example, to create 9 views in vertical and horizontal directions, a round lens would obtain a resolution loss of a factor 9×9, which is unacceptable for most applications.

Thus, a design which can switch between modes without suffering this loss of resolution would be desirable.

According to the invention, there is provided a switchable autostereoscopic display device comprising:
    a display panel having an array of display pixels for producing a display, the display pixels being arranged in rows and columns; and
    an imaging arrangement for directing the output from different pixels to different spatial positions to enable a stereoscopic image to be viewed,
wherein the imaging arrangement is electrically switchable between at least three modes comprising a 2D mode and at least two 3D modes, one 3D mode providing parallax substantially only in a first direction and the other 3D mode providing parallax substantially only in a second substantially perpendicular direction, and wherein the imaging arrangement comprises an electrically configurable graded index lens array.

In addition to providing different directions of parallax, the 3D modes may provide a different number of 3D views or a different image resolution per view.

The directions may be horizontal and vertical or at a slant with respect to the horizontal and vertical.

The display panel preferably comprises an array of individually addressable emissive, transmissive, refractive or diffractive display pixels, for example a liquid crystal display panel.

The imaging arrangement comprises a controllable lens device in the form of an electrically configurable graded index lens array. The lens array can then comprise a layer of liquid crystal material sandwiched between first and second electrode layers for controlling the potential across the liquid crystal layer.

This provides a low cost and easily controlled device for determining the mode of operation of the display. Each electrode layer preferably comprises an electrode pattern comprising first and second interleaved comb electrodes, the comb fingers defining a plurality of parallel electrode portions. The parallel electrode portions of the first and second electrode layers are non-parallel and preferably perpendicular with each other. This enables the electrodes to define two different lens axes, which can be selected to correspond to different viewing orientations.

A third electrode or conductor layer can be provided between the interleaved electrode portions to improve the switching performance and to tune the lens shape and optical characteristics.

In all cases, the imaging arrangement may be electrically switchable such that selected portions can be operated in two of the at least three modes at the same time. For example a 2D image portion and a 3D image portion can be viewed simultaneously, and/or different 3D modes for different portions.

The device of the invention can be used in a display system having a controller for controlling the mode of the imaging arrangement in dependence on the image data. This may thus provide an automatic response to image data to provide the intended 3D output. Of course, manual mode operation may also be provided. A format detection unit can be provided for detecting the format of the image data.

Furthermore, a format conversion unit can be provided for changing the format of the image data if it is incompatible with the display device.

The invention also provides a method of controlling an autostereoscopic display device comprising a display panel and an imaging arrangement for directing the display panel output to different spatial positions to enable a stereoscopic image to be viewed, the method comprising:
  selecting between a 2D mode and at least two 3D modes, one 3D mode providing parallax substantially only in a first direction and the other 3D mode providing parallax substantially only in a second substantially perpendicular direction, selecting between the at least two 3D modes comprising selecting a viewing orientation for the display;
  electrically switching the imaging arrangement to provide the selected mode of operation by electrically configuring a graded index lens array; and
  driving the display panel to provide a display output suitable for the selected mode.

An embodiment of the invention will now be described, purely by way of example, with reference to the accompanying drawings, in which.

The invention provides a switchable autostereoscopic display device in which an imaging arrangement comprising an electrically configurable graded index lens array directs the output from different pixels to different spatial positions to enable a stereoscopic image to be viewed. The imaging arrangement is electrically switchable between at least three modes comprising a 2D mode and two 3D modes. This enables the display to be configured by means of the imaging arrangement for different resolutions, numbers of views or display orientations, with a single design.

Figure 1:
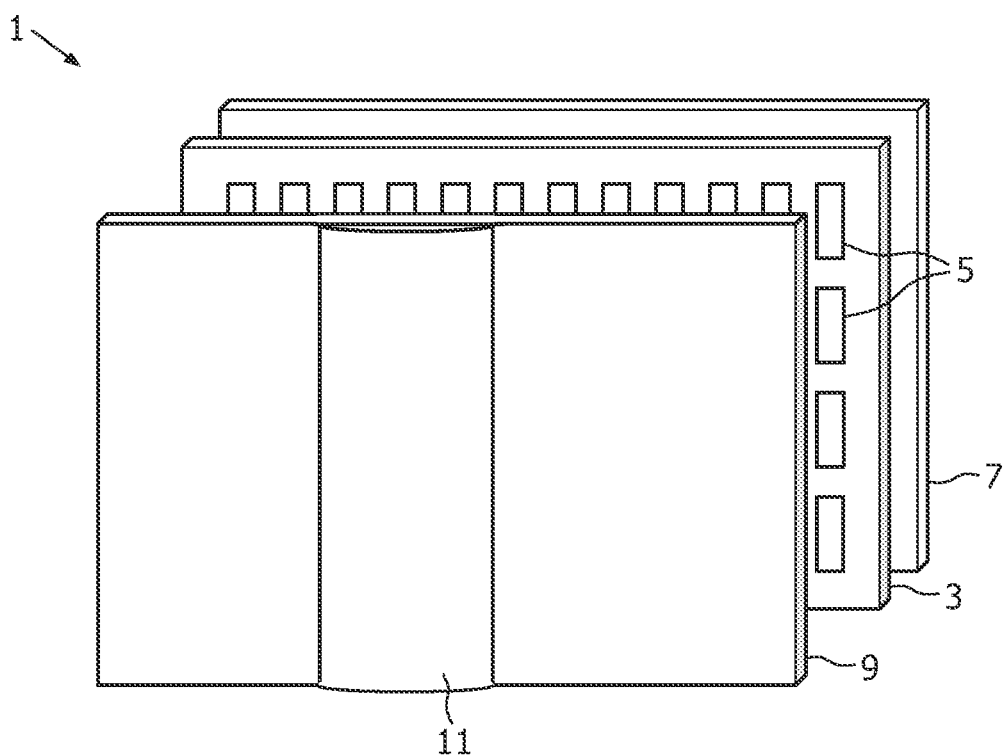
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

Figure 2:
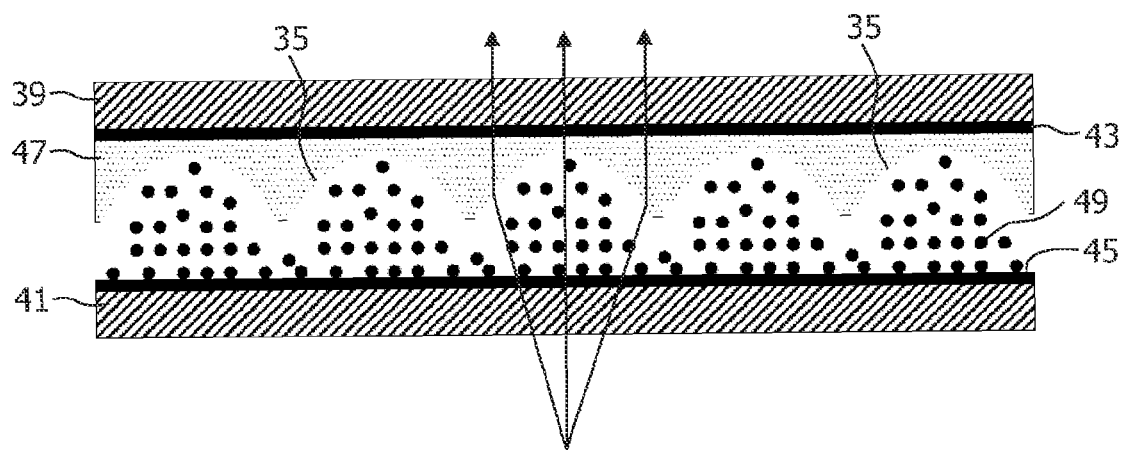
FIGS. 2 and 3 are used to explain the operating principle of the lens array of the display device shown in FIG. 1.
Figure 3:
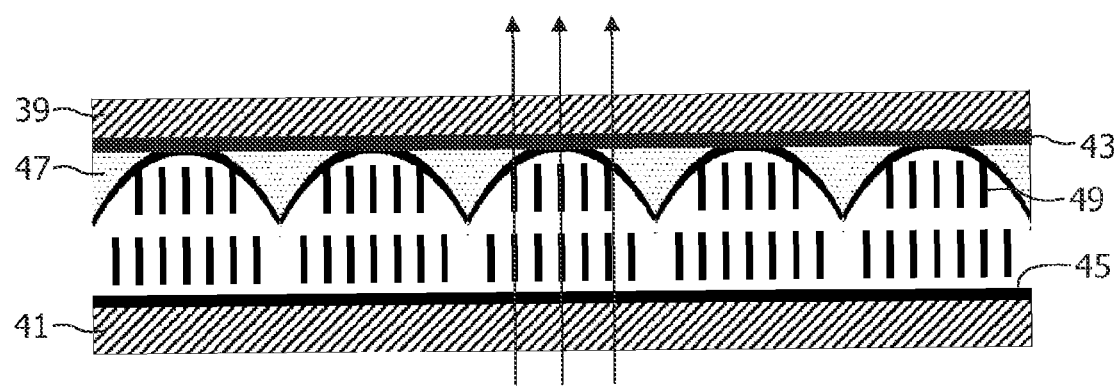

FIGS. 2 and 3 schematically show an array of electrically switchable lenticular elements 35 which can be employed in the device shown in FIG. 1. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in FIGS. 2 and 3. Surfaces of the inverse lens structure 47 and the lower substrate 41 that are in contact with the liquid crystal material are also provided with an orientation layer (not shown) for orientating the liquid crystal material. FIG. 2 shows the array when no electric potential is applied to the electrodes 43, 45. In this state, the refractive index of the liquid crystal material 49 for light of a particular polarization is substantially higher than that of the inverse lens array 47, and the lenticular shapes therefore provide a light output directing function, as illustrated.

FIG. 3 shows the array when an alternating electric potential of approximately 50 to 100 volts is applied to the electrodes 43, 45. In this state, the refractive index of the liquid crystal material 49 for light of the particular polarization is substantially the same as that of the inverse lens array 47, so that the light output directing function of the lenticular shapes is cancelled, as illustrated. Thus, in this state, the array effectively acts in a "pass through" mode.

The skilled person will appreciate that a light polarizing means must be used in conjunction with the above described array, since the liquid crystal material 49 is birefringent, with the refractive index switching only applying to light of a particular polarization. The light polarizing means may be provided as part of the display panel or the imaging arrangement of the device.

Further details of the structure and operation of arrays of switchable lenticular elements suitable for use in the display device shown in FIG. 1 can be found in U.S. Pat. No. 6,069,650.

Figure 4:
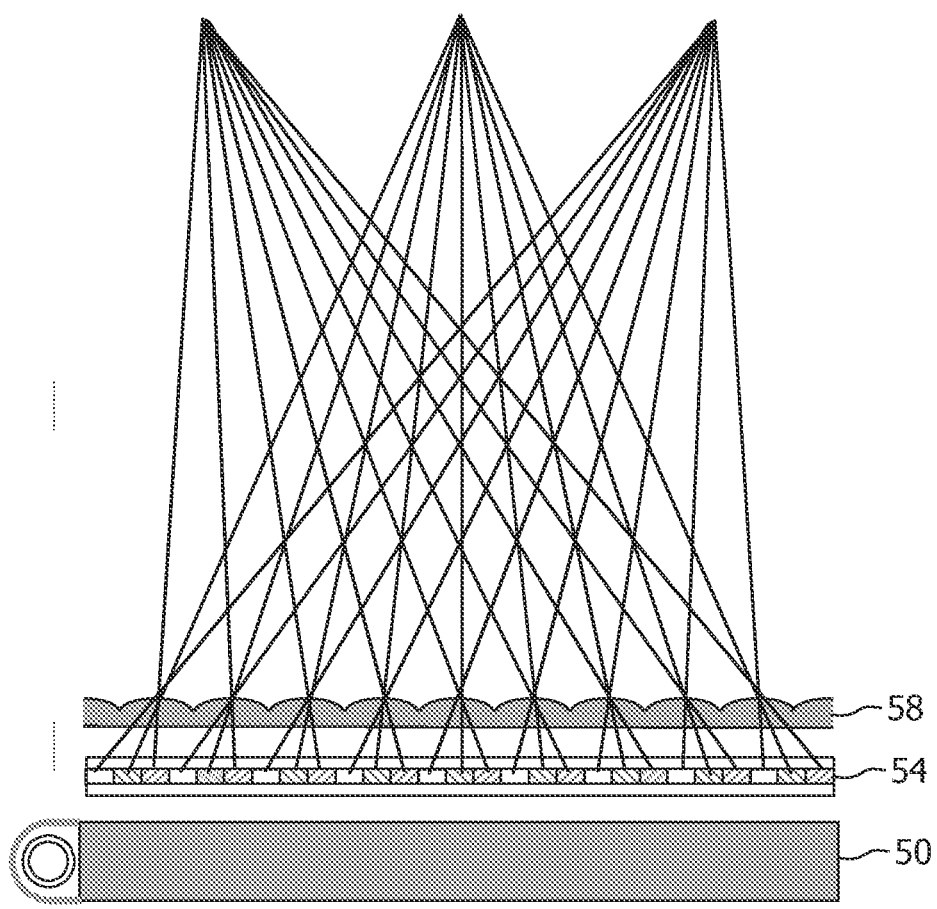
FIG. 4 shows how a lenticular array provides different views to different spatial locations.
Figure 5:
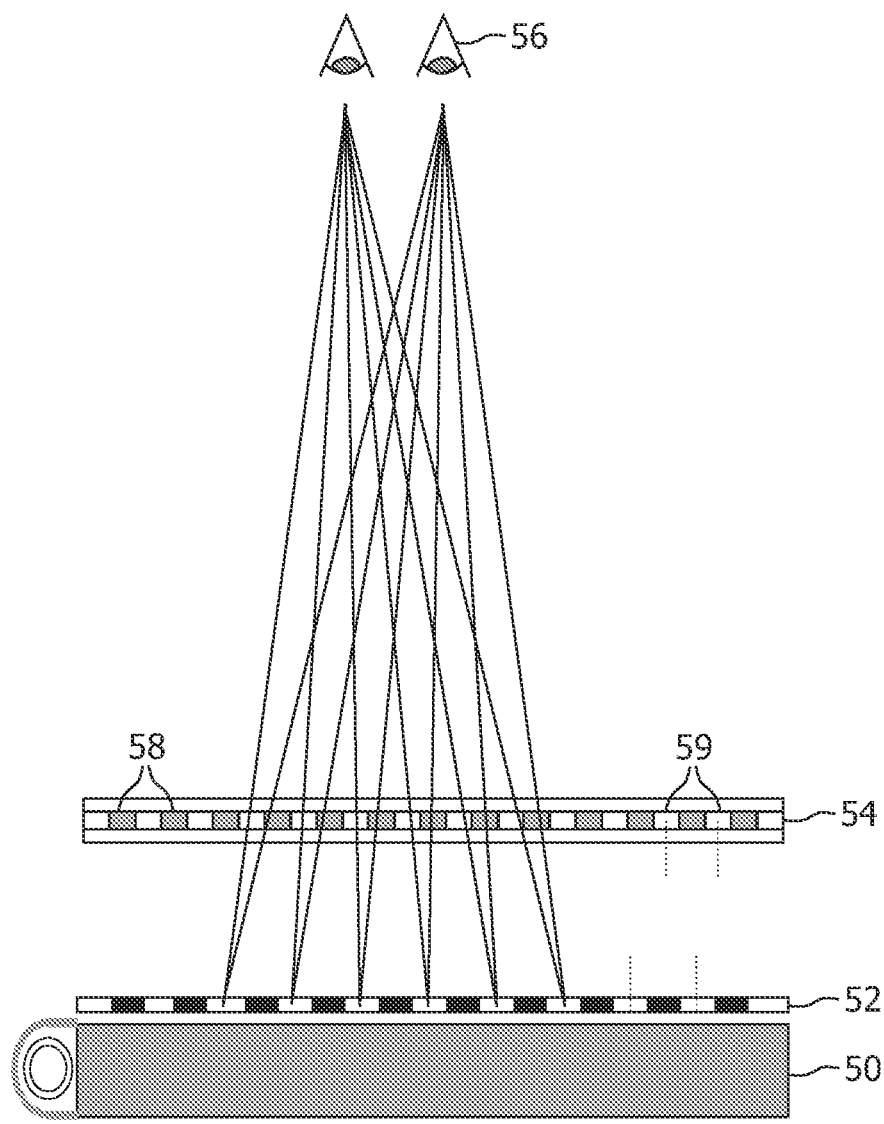
FIG. 5 shows how a barrier arrangement provides different views to different spatial locations.

FIG. 4 shows the principle of operation of a lenticular type imaging arrangement as described above and shows the backlight 50, the display device 54 such as an LCD, and the lenticular array 58. FIG. 5 shows how the lenticular arrangement 58 directs different pixel outputs to different spatial locations.

FIG. 5 shows the principle of operation of a barrier type imaging arrangement showing the backlight 50, barrier device 52 and display device 54 such as an LCD. FIG. 5 shows how the barrier device 52 provides a patterned light output. This means that different pixels are illuminated by discontinuous light source regions, with the effect that a light directing function is implemented. As shown, pixels 58 for one view are illuminated from one direction and pixels 59 for another view are illuminated from another direction. The two eyes 56 of the viewer receive light modulated by different pixels of the display.

Figure 6A:
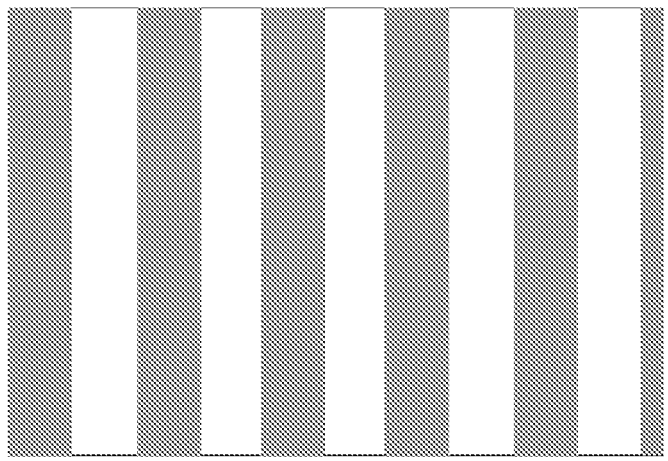
FIG. 6(a) shows a known barrier arrangement.
Figure 6B:
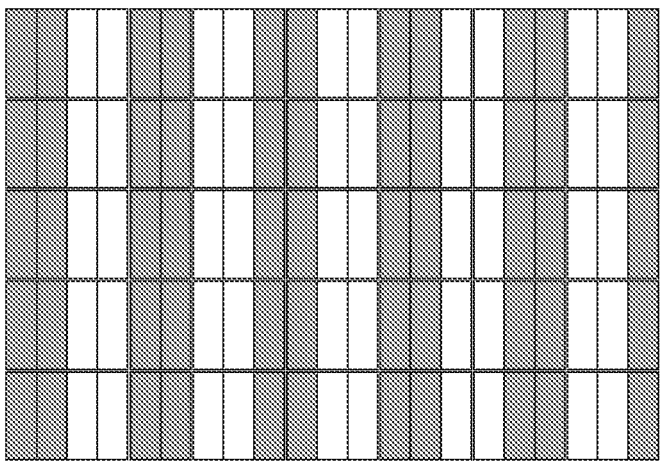
FIGS. 6(b) and 6(c) shows a barrier arrangement proposed by the applicant configured into different modes.
Figure 6C:
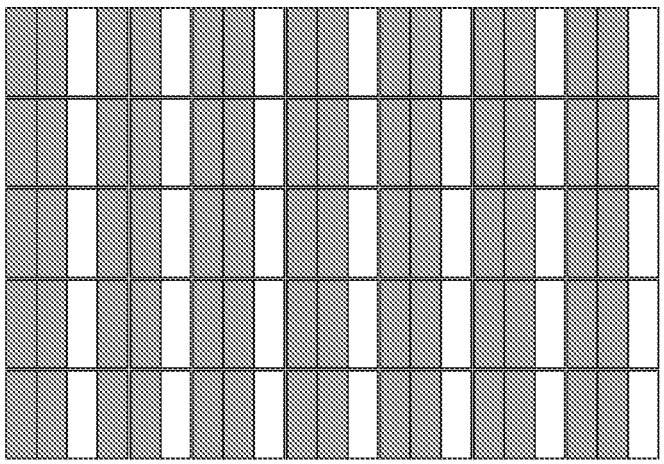

The known barrier arrangement of FIG. 5 is shown in FIG. 6(*a*) and consists of a simple passive matrix liquid crystal (LC) panel with a simple electrode structure. The electrodes on one of two glass plates are arranged in columns. The LC material underneath the electrodes can be switched such that, with help of polarizers, the light can be transmitted or blocked. In such a way, a switchable barrier pattern is obtained that enables a 2-view or multi-view display that can be switched between a certain 3D mode and a 2D mode. Only a single pre-determined barrier pattern is possible. As a result, apart from the regular 2D format, the 3D display can only accept a single 3D format.

This invention relates to the provision of multiple 3D modes so that the display can be provided with additional functionality or can be adaptable to different input data formats.

The applicant has recognized the benefit of enabling the display to accept a broad range of 3D image formats, by adapting the display to the image content being processed. The applicant has recognized that this concept can be applied to barrier type imaging arrangements, and also to lenticular imaging arrangements.

The examples below maintain the basic structure of FIG. 1, namely a light source, a display panel, and an imaging arrangement for providing directed light output.

A first example concerns a modified barrier arrangement, and is shown in FIG. 6(*b*). In this case, the barrier is an active-matrix monochrome LC panel with columns and/or rows of individually addressable pixels. When such a panel is used (in combination with polarizers) a re-configurable barrier pattern can be made.

The resolution of the matrix elements is smaller than the desired barrier pitch, so that different barrier configurations can be implemented. In the example of FIG. 6, the barrier matrix resolution is half the barrier pitch. The barrier matrix elements may have a pitch equal to the pixel pitch.

This can be used for example to enable switching of the barrier pattern from a pattern corresponding to a 2-view 3D display to that corresponding to a 3-view 3D display. For example, FIG. 6(*b*) shows the barrier configured to block half the light source output for a two view 3D display, and FIG. 6(*c*) shows the barrier configured to block two thirds of the light output for a three view 3D display.

Figure 7:
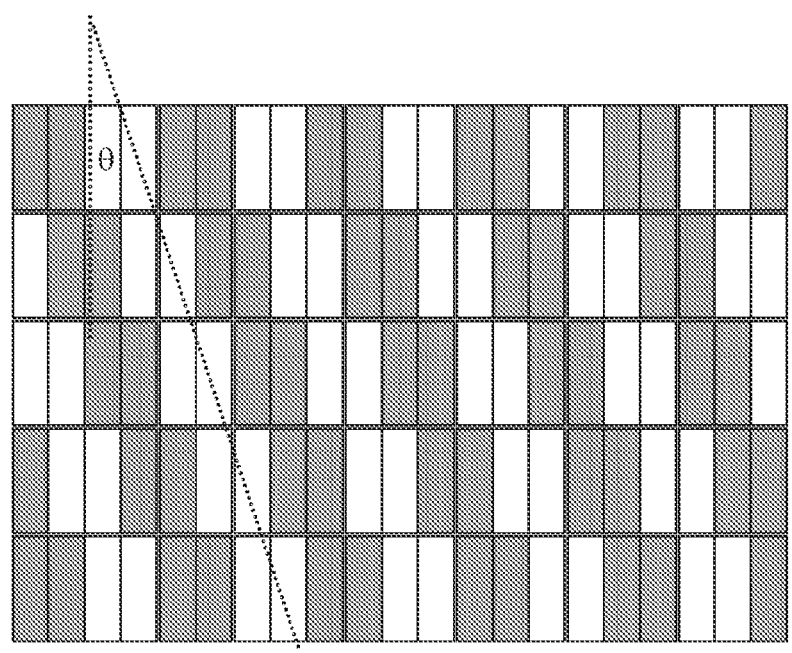
FIG. 7 shows the barrier arrangement of FIGS. 6(b) and 6(c) configured into a further mode providing a slanted focusing arrangement.

It is also possible to give the barrier pattern a slant angle as shown in FIG. 7. This can be advantageous since with this degree of freedom it is possible to distribute the resolution loss when viewing 3D between the horizontal and vertical directions. The use of slanting lenticular lenses for this purpose is known. When a barrier or lenticular with a slant angle that is zero is used in order to generate n views, the perceived resolution of each view along the horizontal direction is reduced by a factor of n relative to the 2D case. The resolution in the vertical direction will not be reduced. By slanting the barrier or lenticular, it is possible to distribute the resolution loss among the horizontal and vertical directions. In practice, this improves the perceived image quality significantly.

Figure 8:
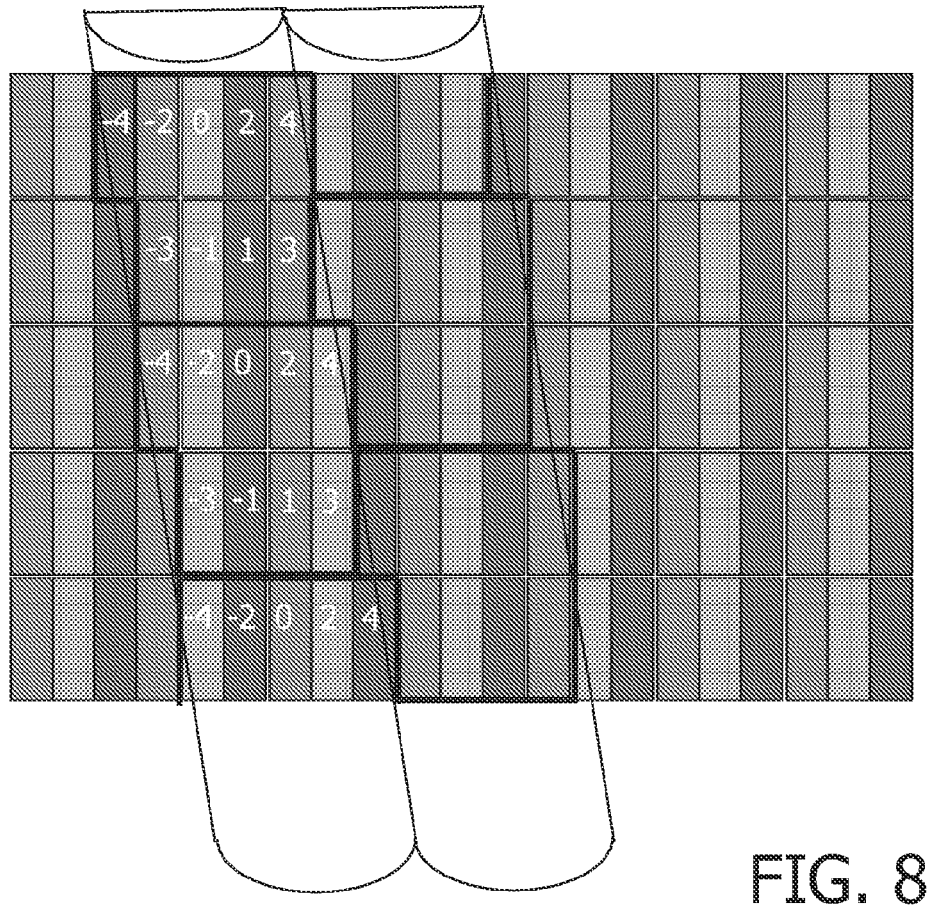
FIG. 8 is used to explain the benefit of a slanted focusing arrangement.

By way of example, FIG. 8 shows the sub-pixel layout of a 9-view display. The columns are arranged as red, green and blue columns of sub pixels in sequence, and two overlying lenticular lenses are shown. The numbers shown refer to the view number which the sub-pixels contribute to, with the views numbered from −4 to +4, with view 0 along the lens axis. When the aspect ratio of the sub-pixels is 1:3 as in this example (each pixel comprises a row of three sub-pixels) the optimum slant angle is $\tan(\theta)=\frac{1}{6}$. As a result, the perceived resolution loss per view (compared to the 2D case) is a factor of 3 in both the horizontal and vertical direction instead of a factor of 9 in the horizontal direction when the slant angle is zero.

The use of a controllable display matrix as the barrier also enables the barrier pattern to be rotated by 90 degrees. This enables the display to be physically rotated by 90 degrees whilst still being able to perceive the 3D effect. An application being enabled by this is for example a monitor that can be used to view 3D images in a landscape mode as well as a portrait mode.

The same effect as the active matrix barrier can be achieved by having a pixellated emissive panel to make a re-configurable pattern of lines emitting light. Such an emissive panel could for example be an organic LED (OLED) display.

The use of barrier patterns has the disadvantage of poor output efficiency. The same concept of re-configurability can however be applied to a lenticular lens array.

This approach is explained with reference to FIGS. 9 and 10, which show the use of graded-index (GRIN) lenses in accordance with the invention.

These lenses comprise a layer of LC material 90 sandwiched between electrodes layers 92,94 provided on glass plates 96,98.

The electrode layers have transparent electrode structures, for example formed of ITO. Each glass plate is provided with a polyimide layer which is rubbed, and the rubbing direction of the plate that is against the display (the back plate) matches the polarization direction of the light that leaves the display. The front plate rubbing direction is preferably the same to avoid polarization rotation and additional refraction in the 2D mode. In a preferred embodiment there is no twist in the LC material.

If there is no voltage difference across the LC cell, the LC molecules are oriented parallel to the plane of the glass plates, and the LC cell is not active as it acts as a parallel layer. If there is a voltage difference across the cell, the LC molecules are oriented differently.

Figure 9A:
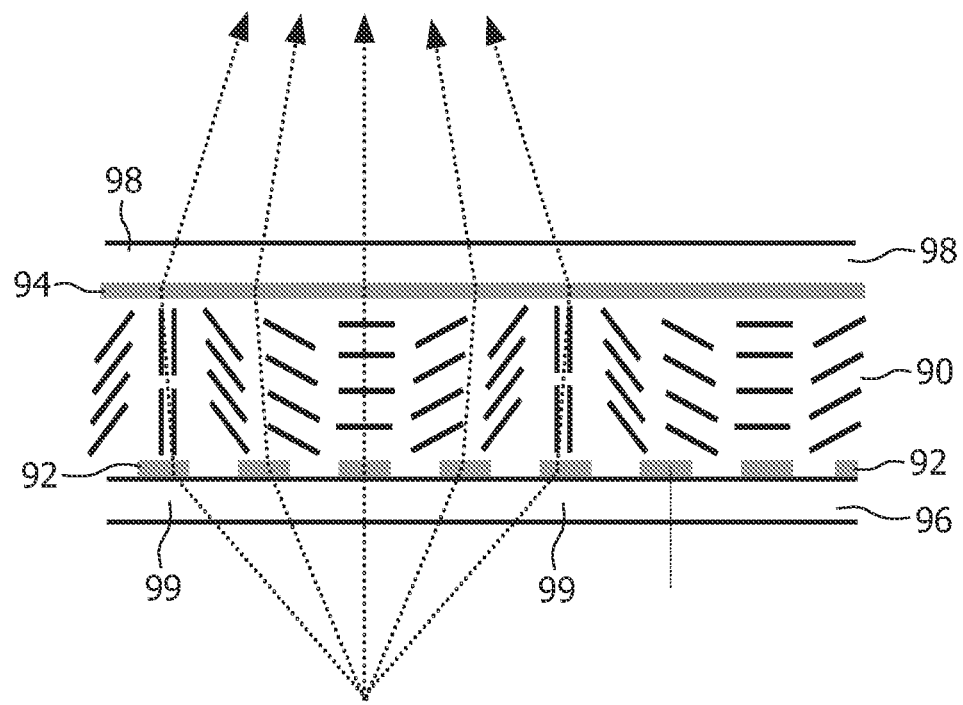
FIG. 9 shows an electrically controllable GRIN lens arrangement of the invention in two different control modes.
Figure 9B:
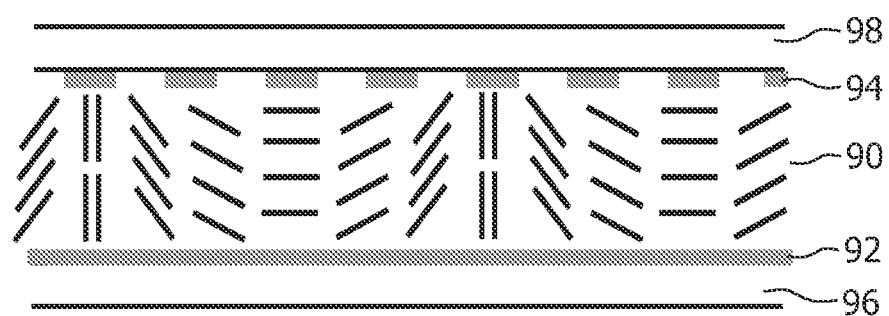

FIG. 9(a) shows the imaging device having with a continuous top electrode layer and a segmented bottom electrode layer. As discussed below, the top electrode is also segmented but perpendicular to the bottom electrode layer so that the segments can not be seen in the Figure.

In one example, each electrode can be addressed individually by means of active matrix circuitry. By applying suitable potentials on the electrodes, it is possible to direct the molecules in the LC material such that the index of refraction acquires a profile that, in effect, results in a lens action, and this is a so-called graded-index (GRIN) lens. In FIG. 9(a), the two segmented electrodes 99 have opposite voltages applied which cause the LC molecules to align in the vertical direction. The electrodes between are not switched, and the LC molecules are thus controlled to undergo a 180 degree twist between electrodes 99. By controlling the distribution of electric potentials in the lateral direction between successive segmented electrodes, the effective lens shape and size can be altered. The dotted lines in FIG. 9(a) show the lens focusing function.

One of the electrode arrangements can comprise an array of electrodes in one direction, and the other can comprise an array of electrodes in an perpendicular direction. For example, FIG. 9(a) can be considered to be a cross section along the top electrode direction, and FIG. 9(b) can be considered to be a perpendicular cross section along the bottom electrode direction. By selecting which electrode pattern is to be driven as a single common electrode and which is to be individually addressed as a matrix array, the lens orientation can be controlled, to enable the 90 degree display rotation mentioned above.

Figure 10A:
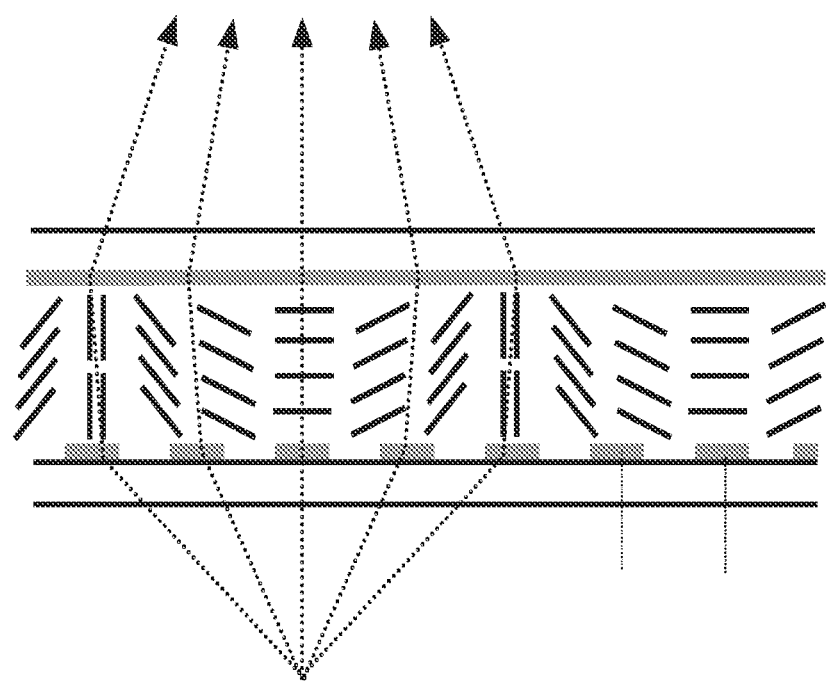
FIG. 10 shows how the lens arrangement of FIG. 9 can be controlled to provide a lens shift function.
Figure 10B:
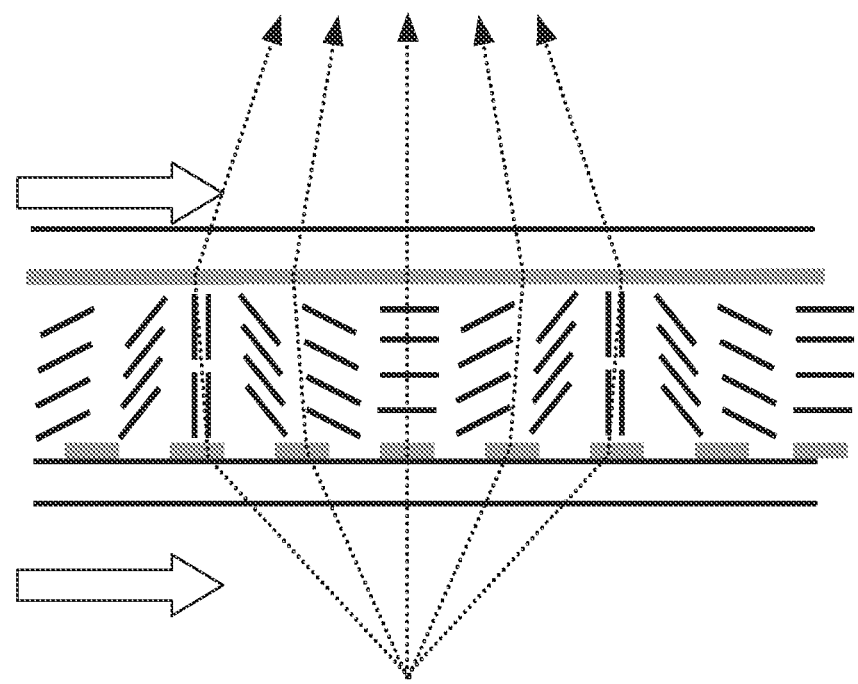

By displacing the potentials applied to the matrix electrode array, the position of the lens can be shifted in the lateral direction, and this is illustrated in FIG. 10, where a lateral shift is shown between FIGS. 10 (a) and (b).

In this way, the diameter and strength of the lens can be changed, albeit within boundaries. Thus, this device provides sufficient degrees of freedom in order to realize a reconfigurable lenticular lens arrangement.

As mentioned above, in order to provide the ability to rotate the lens function, both the top and bottom electrodes should be segmented.

Figure 11:
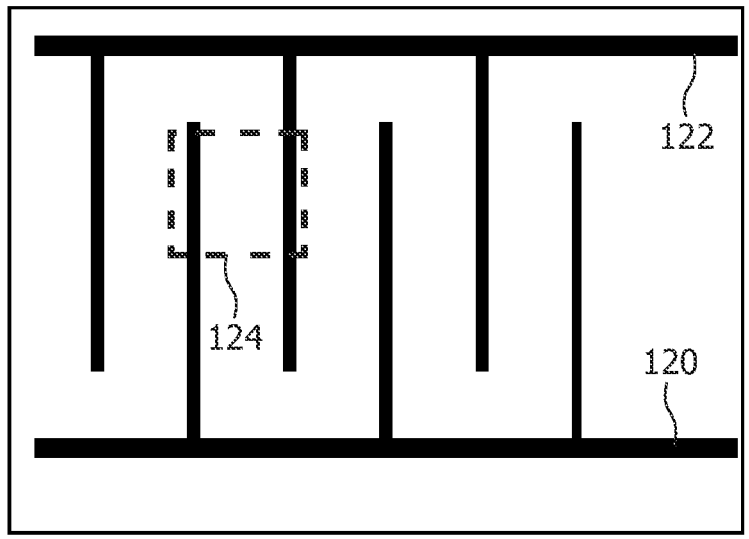
FIG. 11 shows one example of an electrode pattern for use with the lens arrangement of FIG. 9.
Figure 11:
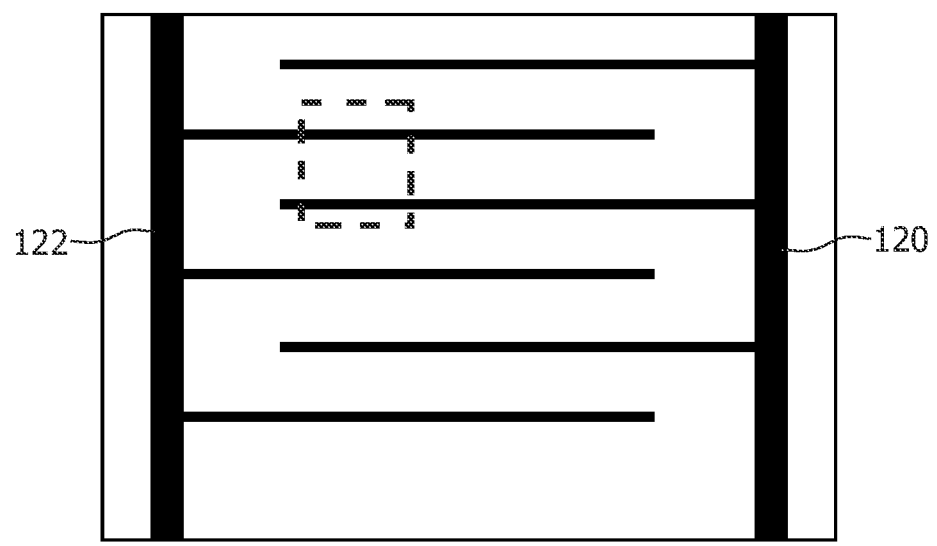
Figure 12:
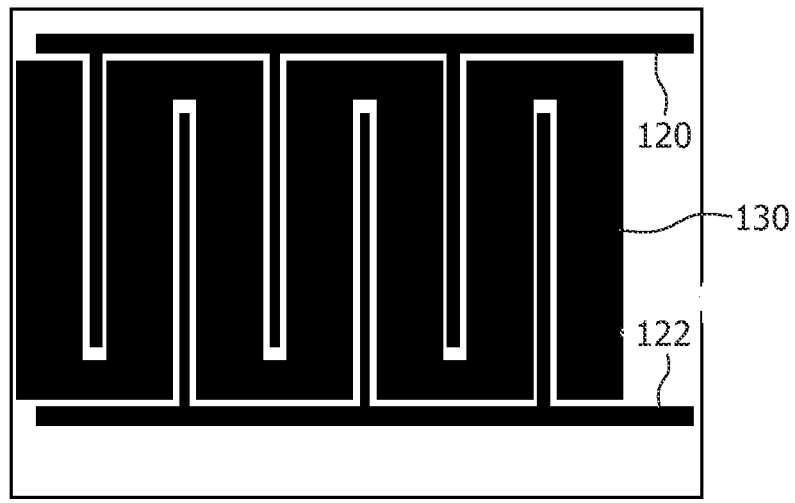
FIG. 12 shows a modification to the electrode pattern of FIG. 11.

An illustration of one possible set of electrode structures of the invention is shown in FIG. 11. FIG. 11(a) shows the top substrate electrode pattern and FIG. 12(b) shows the bottom electrode pattern. On each substrate, the electrode arrangement comprises two comb electrodes 120, 122 which are interleaved. The fingers of the comb electrodes thus define an array of parallel electrode portions, and in this example, alternate electrode portions belong to a different one of the comb electrodes 120,122. In this example, the portions are not independently controlled. This means the lens pitch cannot be varied and the electrode design is for providing rotation only. However, the drive hardware and the drive method are simplified. One electrode arrangement is driven with only one drive voltage, and the other electrode arrangement is driven with only two drive voltages, one of which can be the same as for the first arrangement. There is also no need for a matrix addressing driver.

The two electrode patterns are essentially 90 degree rotations of each other, in order to provide the same slant angle of the lenses as seen by the viewer in the vertical and horizontal modes.

This is not essential, and the slant angle may be different for the different rotations, for example to provide different horizontal versus vertical resolution balance. FIG. 11 shows a single lens portion as 124, and this is one portion of a horizontal or vertical lenticule, depending on the control voltages applied.

The lens may be formed between adjacent electrode portions, as shown by the area 124, or one lens may span across multiple electrode portions, as shown in FIGS. 9 and 10. In this implementation, each lens is defined between two adjacent electrode lines. In addition to the control electrodes shown, a third electrode or a material/layer with a selected conductivity can be placed between the two comb electrodes as shown as item 130 in FIG. 12.

Figure 13:
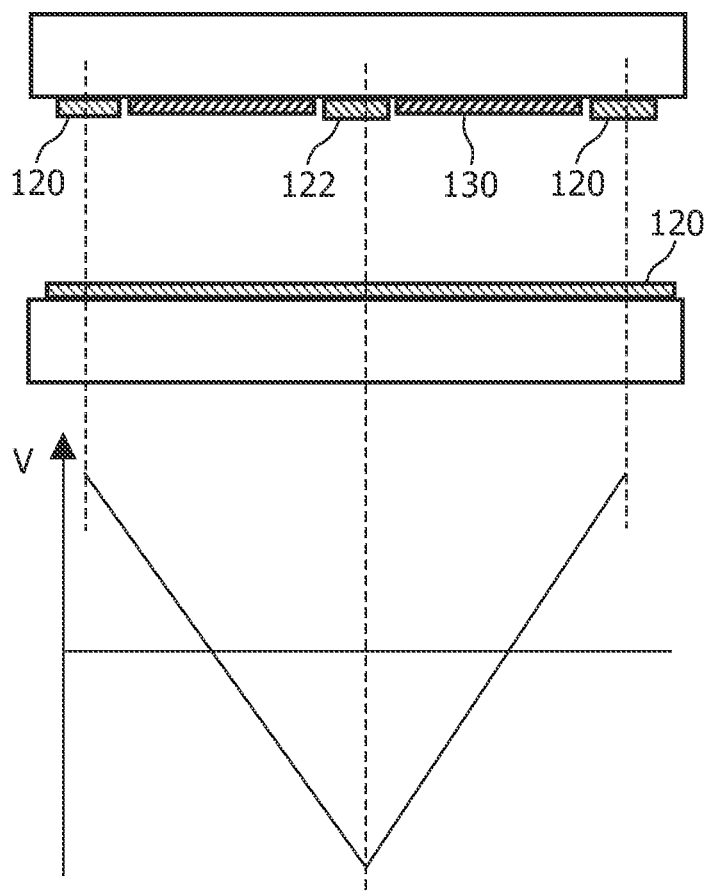
FIG. 13 shows the benefit of the modification of FIG. 12.

This third electrode 130 can be driven to ground if it is controlled, or if it is simply a passive element, the conductivity is selected to provide that there is a desired potential distribution between the first and second comb electrodes 120,122, as shown in FIG. 13.

In FIG. 13, the parallel electrode portions of the top electrode can be seen, whereas the cross section is along one electrode portion of the bottom electrode layer. The additional layer 130 can be seen for the top electrode layer, and the approximate voltage distribution is shown at the bottom of the Figure.

By locally adjusting the conductivity, the lens strength and shape can be tuned. The cell is driven by an ac voltage waveform (as is well known for LC driving). In the first mode, for example a vertical parallax mode, the electrodes on the first plate are all connected to ground potential. The first and second comb electrodes on the second plate are connected to an alternating source with opposite sign. This means that adjacent electrode portions (the parallel lines) are of opposite sign, and this creates the lens effect shown in FIGS. 9 and 10. In the second mode, for example horizontal parallax, the electrodes on the second plate are all connected to ground potential. The first and second electrode on the first plate are connected to an alternating source with opposite sign. Thus, the electrode drive scheme is simply reversed.

The driving voltage is typically in the range of 10-20 Volts.

In the 2D mode, all electrodes are placed at the same potential.

The various designs described above enable the display to be adapted physically either to the data received or to the display orientation.

Figure 14:
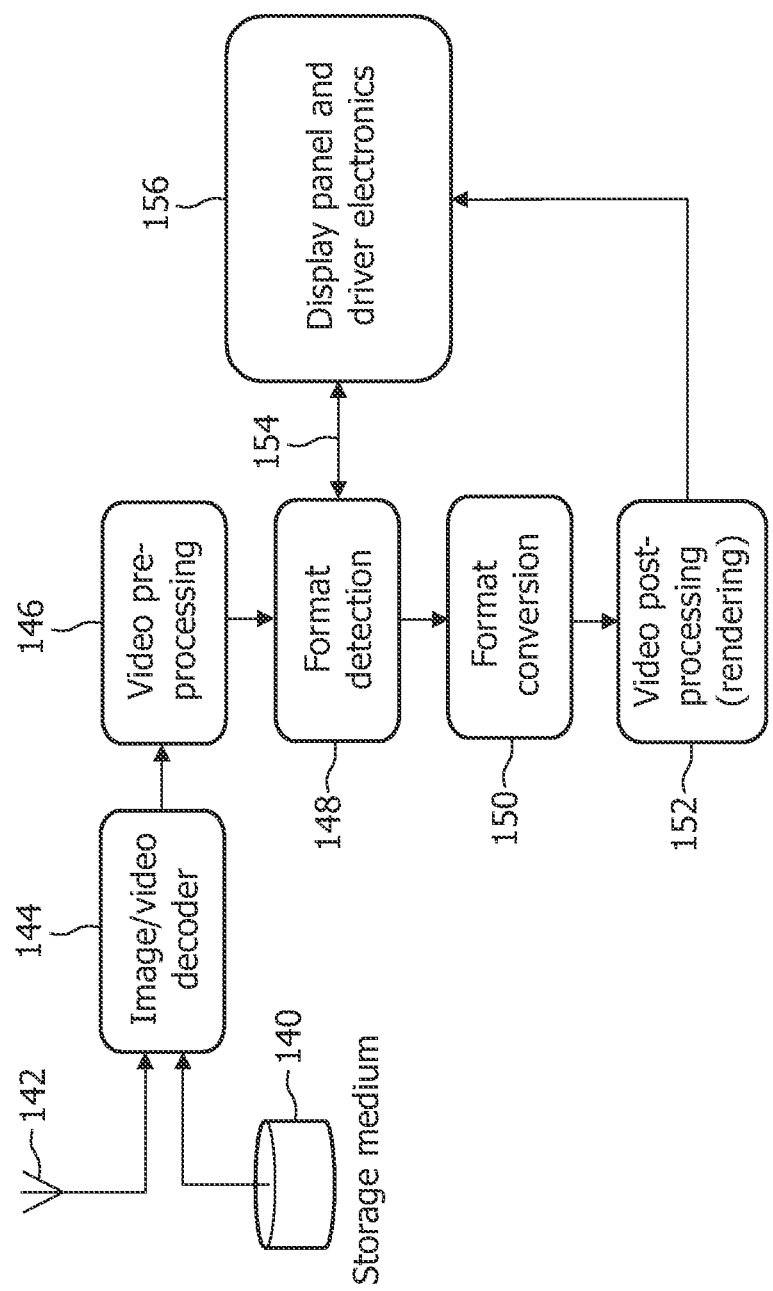
FIG. 14 shows a display system of the invention.

FIG. 14 shows a block diagram of an adaptive 3D display of the invention. Image data is received from a storage medium 140 or live from an antenna 142 and is processed by an image/video decoder 144. Conventional video processing takes place in block 146.

The format detection unit 148 allows the 3D format of the received image to be detected (such as the number of views) and enables the display format to be detected, such as the orientation.

Based on the detected image format and the display capabilities, data format conversion may be required in block 150, and the image data is then prepared for display in an image rendering unit 152. However, in addition, the 3D imaging arrangement can be controlled as shown by arrow 154, so that the control of the display panel involves control of the lens array configuration as well as the control of the data provided to the display panel. These are controlled together to provide the desired 3D effect.

This architecture allows the display to adapt its hardware (namely the lens configuration) to the 3D format offered. If the display is unable to adapt sufficiently, the 3D video content can be converted to a format that complies with the range of formats the 3D display can handle.

The output can be switched between landscape and portrait modes so that the 3D effect can be maintained when rotating the display.

The examples above have discussed the 3D display modes as general image formats. It is also possible to switch various regions of the display to various 3D formats. An example is switching most of the display to a 2D mode and having a region of the display showing n-view images/video while having another region showing m-view images/video with n different to m.

It is also possible to re-configure the imaging arrangement such that simultaneously horizontal as well as vertical parallax or parallax within a range of angles can be created. This could be achieved, for example, by connecting both of the electrode plates shown in FIG. 11 to an alternating source with opposite sign.

The examples described above employ a liquid crystal display panel having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

The manufacture and materials used to fabricate the display device have not been described in detail, as these will be conventional and well known to those skilled in the art.

The preferred example of controllable lens array has segmented row and column electrodes, but only segmented column electrodes are required to enable compatibility with multiple different views.

Various other modifications will be apparent to those skilled in the art.

The invention claimed is:

1. A switchable autostereoscopic display device comprising:
    a display panel having an array of display pixels for producing a display, the display pixels being arranged in rows and columns; and
    an imaging arrangement for directing the output from different pixels to different spatial positions to enable a stereoscopic image to be viewed,
    wherein the imaging arrangement is electrically switchable between at least three modes comprising a 2D mode and at least two 3D modes, one 3D mode providing parallax substantially only in a first direction and the other 3D mode providing parallax substantially only in a second substantially perpendicular direction, and wherein the imaging arrangement comprises an electrically configurable graded index lens array;
    wherein the lens array comprises a layer of liquid crystal material sandwiched between first and second electrode layers, wherein said layer of liquid crystal material, in response to a potential across the liquid crystal layer applied by the electrode layers, realizes a lens function of said electrically configurable graded index lens array, and wherein one or more of a lens size, a lens shape, and a lens orientation for the electrically configurable graded index lens array are controllably configured by said potential,
    wherein each electrode layer comprises an electrode pattern comprising first and second interleaved comb electrodes, the comb fingers defining a plurality of parallel electrode portions, and
    wherein the parallel electrode portions of the first and second electrode layers are perpendicular to each other.

2. A device as claimed in claim 1 wherein two of the at least two 3D modes have a different number of 3D views.

3. A device as claimed in claim 1, wherein two of the at least two 3D modes have a different image resolution per view.

4. A device as claimed in claim 1, wherein the first direction is substantially perpendicular to a column direction with respect to a first viewing orientation of the display and second direction is substantially perpendicular to a column direction with respect to a second, different, viewing orientation of the display.

5. A device as claimed in claim 1, wherein the display panel comprises an array of individually addressable emissive, transmissive, refractive or diffractive display pixels.

6. A device as claimed in claim 1, wherein the display panel is a liquid crystal display panel.

7. A device as claimed in claim 1, wherein one or both electrode layers further comprises a third electrode between the interleaved electrode portions.

8. A device as claimed in claim 7, wherein the third electrode substantially fills the spacing between the interleaved electrode portions.

9. A device as claimed in claim 1, wherein one or both electrode layers further comprises a third conductor pattern between the interleaved electrode portions.

10. A device as claimed in claim 1, wherein the imaging arrangement is electrically switchable such that selected portions are operated in two of the least three modes at the same time.

11. The device as defined in claim 1, wherein the electrically configurable graded index lens array includes at least one electrically configurable lenticular lens.

12. A display system comprising:
a switchable autostereoscopic display device comprising:
   a display panel having an array of display pixels for producing a display, the display pixels being arranged in rows and columns; and
   an imaging arrangement for directing the output from different pixels to different spatial positions to enable a stereoscopic image to be viewed, wherein the imaging arrangement is electrically switchable between at least three modes comprising a 2D mode and at least two 3D modes, one 3D mode providing parallax substantially only in a first direction and the other 3D mode providing parallax substantially only in a second substantially perpendicular direction, and wherein the imaging arrangement comprises an electrically configurable graded index lens array; and
a controller for controlling the mode of the imaging arrangement in dependence on the image data;
wherein the lens array comprises a layer of liquid crystal material sandwiched between first and second electrode layers wherein the lens array comprises a layer of liquid crystal material sandwiched between first and second electrode layers, wherein said layer of liquid crystal material, in response to a potential across the liquid crystal layer applied by the electrode layers, realizes a lens function of said electrically configurable graded index lens array, and wherein one or more of a lens size, a lens shape, and a lens orientation for the electrically configurable graded index lens array are controllably configured by said potential,
wherein each electrode layer comprises an electrode pattern comprising first and second interleaved comb electrodes, the comb fingers defining a plurality of parallel electrode portions, and
wherein the parallel electrode portions of the first and second electrode layers are perpendicular to each other.

13. A system as claimed in claim 12, further comprising a format detection unit for detecting a format of the image data.

14. A system as claimed in claim 13, further comprising a format conversion unit for changing the format of the image data if it is incompatible with the display device.

15. The system as defined in claim 12, wherein the electrically configurable graded index lens array includes at least one electrically configurable lenticular lens.

* * * * *